Figure 1:
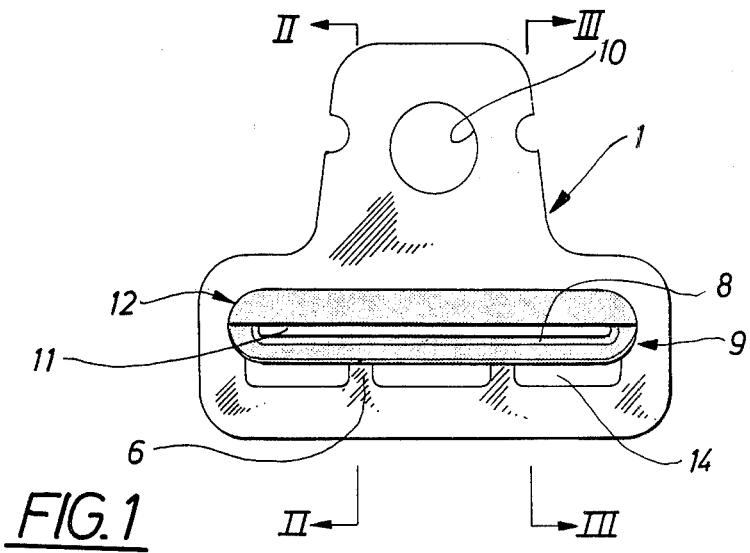

United States Patent [19]

Lindblad

[11] 4,102,020
[45] Jul. 25, 1978

[54] SAFETY BELT DEVICE

[76] Inventor: Stig Martin Lindblad, Västergatan 21, S-440 20 Vårgårda, Sweden

[21] Appl. No.: 698,875

[22] Filed: Jun. 23, 1976

[30] Foreign Application Priority Data

Nov. 28, 1975 [SE] Sweden .................... 7513419

[51] Int. Cl.² .................... A44B 11/02; A47C 31/00
[52] U.S. Cl. .................... 24/164; 24/175; 24/181; 297/389; 280/747
[58] Field of Search .......... 24/175, 190, 181, 164, 24/163 R; 297/389; 280/747

[56] References Cited

U.S. PATENT DOCUMENTS

| 155,813 | 10/1874 | Sterne | 24/190 |
| 356,772 | 2/1887 | Marx | 24/190 |
| 435,880 | 9/1890 | Marx | 24/190 |
| 808,297 | 12/1905 | Miller | 24/181 |
| 935,279 | 9/1909 | Sourek | 24/163 R |
| 1,775,094 | 9/1930 | Salisbury | 24/190 |
| 2,084,412 | 6/1937 | Schaefer | 24/198 |
| 3,981,052 | 9/1976 | Pilarski | 24/193 |
| 4,023,826 | 5/1977 | Kokubo | 24/163 R |

FOREIGN PATENT DOCUMENTS 2,078 of 1886 United Kingdom .......... 24/190

*Primary Examiner*—Bernard A. Gelak

[57] ABSTRACT

Device in connection with safety belts for vehicles comprising a holding part, which can be anchored in the vehicle, and which is provided with a slit through which the band of the belt is arranged to extend. The holding part is designed with a supporting surface, against which the band is arranged to bear, and with a number of locking teeth. The locking teeth are arranged to project from said surface and penetrate the band of the belt, when this is subjected to a load in such a direction that the band of the belt is pressed against said surface with a force, the magnitude of which exceeds a predetermined value.

3 Claims, 10 Drawing Figures

SAFETY BELT DEVICE

The present invention relates to a device in connection with safety belts for vehicles comprising a holding part, which can be anchored in the vehicle, and which is provided with a slit through which the band of the belt is arranged to extend.

By the efforts of authorities as well as industry to increase the safety of our vehicles, more and more increasing claims are made on safety belts. In connection with increasing experience from the field and from practical tests, in connection with which one has subjected safety belts to greater and greater stresses, it has turned out, that also bands of safety belts, which are designed to be of very high strength, can acquire debilitations undefined in advance in connection with an abnormal stress, so that the band can suffer a rupture at a later occasion. A common cause of the appearance of such debilitations has been found to be the fact that the band of the safety belt, when it slides through a slit in a fitting, wherein it usually is deflected or forms a fastening loop, can exhibit a pleating phenomenon in connection with an abnormal stress, by way of example a collision, with the result that the band gets pinched in the slit. The damage thereby caused to the end is of an especially dangerous nature, as it often cannot be directly observed, which can lead to the band not being substituted. At the next stress of magnitude the damage, however, can cause the band to break, so that grave personal injuries arise. Another difficulty, which hitherto has not been mastered, involves a redistribution of the bands in a safety belt in connection with certain types of collision, so that damage can arise on the fastened person. This redistribution occurs on account of the band of the safety belt extending from one band part to another band part via a deflection teeth. In such an arrangement the securing hold will be independent with respect to the positional holding effect.

It is an object of the present invention to eliminate the deficiencies mentioned above by means of a controlled blocking of the band of the safety belt at one or several locations.

It is another object of the invention to provide a device, which in connection with such stresses, which can give rise to damage of the band, clearly indicate this, so that a substitution is initiated.

The objects mentioned are obtained by means of the device according to the present invention which is characterized by the holding part being designed with a supporting surface, against which the band is arranged to bear, and with a number of locking teeth, which are arranged to project from said surface and penetrate the band of the belt when this is subjected to a load arranged to result in a pressure of the band of the belt against said surface with a force, the magnitude of which exceeds a predetermined value.

Figure 4:
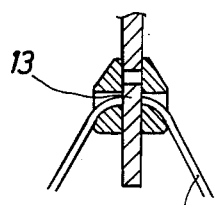
Figure 2:
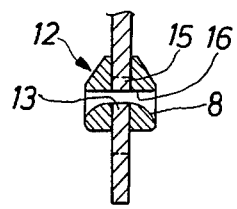
Figure 3:
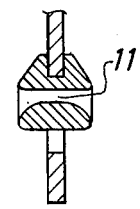
Figure 5:
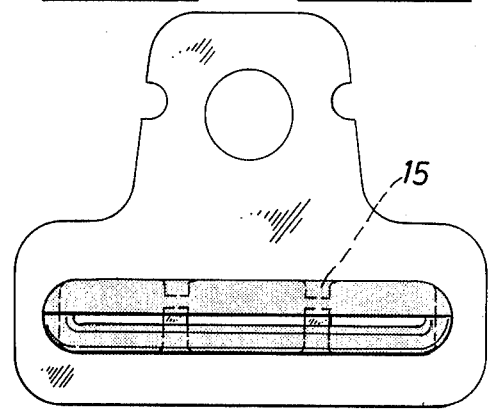
Figure 6:
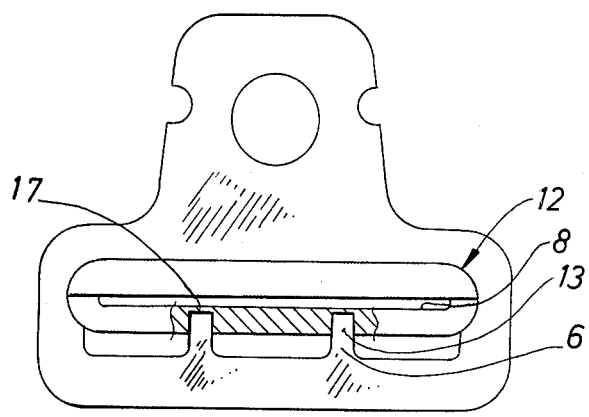
Figure 7:
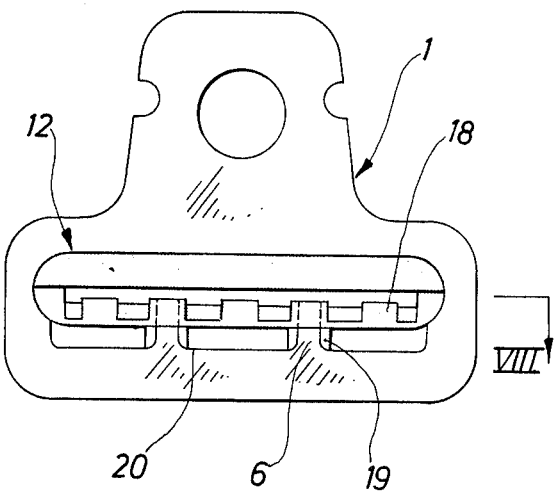
Figure 8:
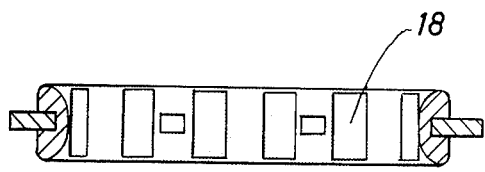
Figure 9:
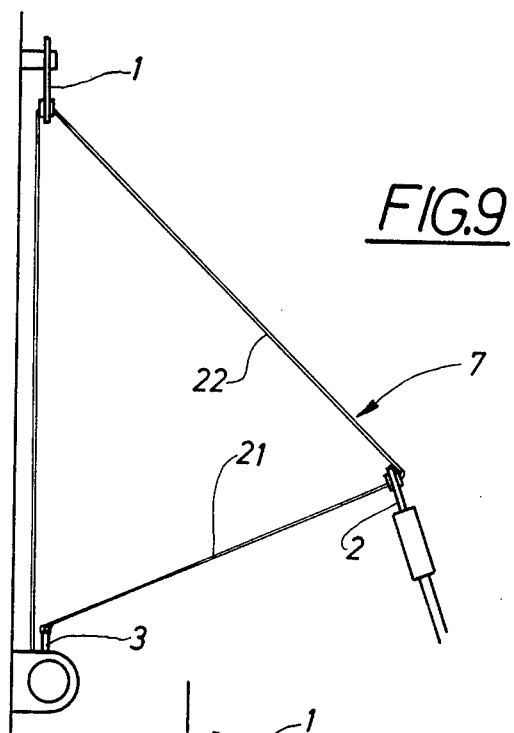
Figure 10:
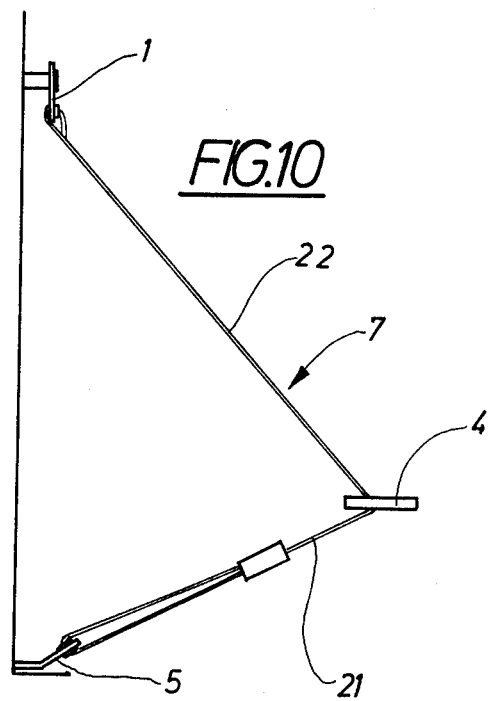

The invention will now be described in the following with a few examples of embodiments, reference being made to the accompanying drawings, in which FIG. 1 shows a fitting of a safety belt provided with a device according to the invention in a first embodiment thereof, FIGS. 2 and 3 illustrate part sections through the fitting along the lines II—II and III—III respectively of FIG. 1, the device according to the invention not being shown in activated condition, FIG. 4 illustrates a view corresponding to FIGS. 2 and 3, but with the device according to the invention in activated condition, FIG. 5 shows a view corresponding the one in FIG. 1 with the device according to the invention in activated condition, FIG. 6 shows the fitting of the safety belt with the device according to the invention in a second embodiment in a partly broken view, FIG. 7 shows the fitting of the safety belt with a device according to the invention in a third embodiment, FIG. 8 shows a cross-sectional view of the device according to the invention in a plane along the line VIII—VIII in FIG. 7, FIG. 9 shows an example of the mounting of the band of the safety belt in a reel type belt according to the invention, and FIG. 10 is an example of mounting of the band of the safety belt in a fixed belt assembly with the device according to the invention.

The fundamental idea of the present invention thus involves a blocking of the band at certain points thereby providing controllable stresses in connection with traffic accidents and a clear indication of whether it is necessary or not to substitute the band of the safety belt. In connection with reel type belts the device according to the invention gives additional safety by the extra locking function, which is obtained. In such cases the device according to the invention takes up the main part of the load on the band of the safety belt. The ordinary locking device of the reel type belt is necessary principally for the triggering of the device according to the invention, in the following called the blocking device. By means of the invention said ordinary locking device can therefore be given a simpler, less space requiring, lighter and cheaper design. As is evident from the figures, this can be accomplished by providing one or more of the belt fittings 1,2,3,4,5, which form part of a safety belt arrangement, with a number of blocking teeth 6, from which the band 7 of the safety belt is kept protected during the normal use of the belt by bearing against a supporting surface 8 located in a slit 11, through which the band can slide. At an abnormal load of the band of the belt, as is the case in connection with a collision or similar, the blocking teeth 6 are arranged to penetrate into the slit 11 from the supporting surface 8 and thereby break through the band of the belt in such a manner that it is impeded from displacing itself in longitudal as well as in crosswise direction.

In the FIGS. 1–5 the blocking device 9 according to the invention is illustrated in a first embodiment, and this is mounted in a supporting part in the form of for example a fitting 1, which is anchored at some fixed point of the vehicle. The fitting shown is provided with an anchoring hole 10, which is intended for an anchoring screw or similar, not shown, which can be fastened to the vehicle. The band 7 of the belt is connected with the fitting in such a manner that it extends through the slit 11 mentioned, which is shaped in a slit unit 12 forming part of the blocking device 9, which slit unit is provided with the supporting surface 8 previously mentioned. As is evident from the figures, the slit unit 12 constitutes a separate piece, which is inserted in an opening in the fitting 1, while the locking teeth 6 in the example shown are shaped in the fitting 1 as two teeth in said opening, which teeth are pointing towards the slit 11 and extend into the slit unit in such a manner that the end portion 13 of the teeth is at a level with the supporting surface 8 for the band 7 of the belt during the normal use of the belt, as shown in FIG. 2.

The slit unit 12 is mounted in such a manner on the fitting 1 that it can be displaced a distance relative to the fitting at an increased engaging pressure of the band 7 of the belt against the supporting surface 8. Such an engaging pressure arises, when the band of the belt is subjected to a load, which exceeds a certain value, whereby the load is transmitted to the fitting by the band either being attached to or being deflected by the fitting. In this respect the device is adjusted in such a manner that this displacement of the slit unit 12 takes place only in connection with an abnormal load on the band of the belt, which exceeds a predetermined value. The movement of displacement is made possible by the slit unit 12 forming a lining of the edge portions of the opening in the fitting 1, which opening in the direction of displacement has accommodations 14, which can receive the slit unit. Thus, this is kept in its unaffected position by the friction against said edge portions and the locking teeth 6 in the example of embodiment shown in the FIGS. 1-5. According to this example the fitting 1 exhibits two pins 15 located each one right in front of its locking tooth 6, which pins as is evident from FIG. 2 penetrate into the slit unit 12 and extend unto the surface located right in front of the supporting surface 8, said surface in the following being denominated the dolly plate 16.

The embodiment of the slit unit 12 illustrated in FIG. 6 differs from the above described first embodiment inasmuch as the locking teeth 6 do not extend to the supporting surface 8, their end portions 13 instead being covered by means of a layer of material in a portion 17 of the supporting surface.

In the FIGS. 7 and 8 a third embodiment of the blocking device according to the invention is illustrated, in which the supporting surface 8 is divided up into several plates 18, which prevent the band 7 of the belt from sliding sidewise and getting pleated. As is evident from the FIG. 7 the slit unit 12 is provided with supporting members 19, which extend along the locking teeth 6 and end against a crosswise located edge portion 20 of the fitting.

In connection with an abnormal load on the band 7 of the belt exceeding a predetermined value, for example in connection with a collision or similar, the engaging pressure of the band against the supporting surface 8 of the blocking device according to the invention, which device forms part of one or several of the belt fittings, increases by these fittings together with the lock of the belt taking up the resulting load on the band 7 of the belt. The slit unit 12 thereby according to the first embodiment is displaced to the position illustrated in FIGS. 4 and 5, because of the friction between the slit unit 12 and the fitting 1 being overcome. This results in the locking teeth 6 with their end portion 13 projects above the supporting surface 8 and penetrating the band 7, which thereby is blocked. With the slit unit 12 being designed with the dolly surface 16 and the pins 15, an efficient punching effect is obtained, which can be perceived from FIG. 4, by the locking teeth 6 penetrating a distance into the space left by the pins 15 at the displacement of the slit unit 12, at the same time as the dolly surface forms a dolly for the band 7 of the belt.

In the embodiment illustrated in FIG. 6 the part 17 located above the locking teeth 6 is first penetrated before said locking teeth reach the band of the belt in order to penetrate the same. Such a design is in practice very advantageous because of the possibility to determine the predetermined force, which shall be overcome, with good accuracy by selection of the thickness of the covered portion 17 and the design and dimensions of the locking teeth 6 which may frictionally engage the slit unit 12 below the portions 17 as described with reference to FIGS. 1-5.

In the embodiment illustrated in the FIGS. 7 and 8 in addition to friction force also the force, which is required for the deformation of the supporting members 19, shall be overcome, which in correspondence to the embodiment illustrated in FIG. 6 facilitates the determination of the required force of dimensions and material.

The manufacture of the blocking device according to the invention can be made very rational by casting the slit unit directly on its place on the actual fitting, the fitting being introduced in a casting mould. One can to advantage chose as material a metal of low melting point, by way of example zinc, which can be epoxy enameled together with the fitting. A plastic material can be used to advantage, by way of example such a polyamid as nylon.

As mentioned above one or several fittings of a safety belt can be provided with the blocking device according to the invention depending upon which type of belt, which is used, and upon which demand is made on the belt. In connection with a reel type belt of the kind schematically illustrated in FIG. 9 at least the upper fitting 1 serving the purpose of deflection member can be provided with the blocking device according to the invention, as it has turned out that just this fastening point is the one most exposed to the phenomenon of pleating of the band with risk of rupture. Also the fitting 2 serving the purpose of locking tongue can to advantage be provided with the blocking device according to the invention, whereby the above mentioned redistribution of the band of the belt between the band parts 21 and 22 is prevented. It can also be imagined to provide the fitting 3, serving the purpose of a lower anchoring point, with the blocking device according to the invention in order to prevent the above mentioned pleat action and in addition thereto obtain an indication of the belt having been subjected to an overload. In a corresponding manner the fittings in a fixed belt can be provided with blocking devices according to the invention, as is shown in FIG. 10. Also when the band of the belt is fastened by a fixed anchoring in the upper fitting 1, a risk of pleating can arise, and the need exists to receive an indication that the belt has been overloaded. A redistribution between the belt parts 21 and 22 can occur also in connection with the fixed belt by the band 7 sliding through the fitting 4. By providing the lower fitting 5 with the blocking device, the risk of the band at a collision sliding also in the longitudinal direction on account of the adjusting means being worn is eliminated. In all cases the blocking device as mentioned above serves the purpose of an indicatior signalling if the band of the belt has been subjected to such great stresses that it has to be substituted.

The invention is not limited to the examples of embodiment described above and illustrated in the drawings, but can be varied within the scope of the following claims. By way of example the slit unit 12 as well as the locking teeth 6 can be shaped in a different manner. The locking organs by way of example can be designed with a pointed end portion or entirely with converging lateral surfaces.

I claim:

1. A guide slit device for safety belts for vehicles comprising a holding part to be anchored in a vehicle, said holding part having an opening therein, a separate slit unit arranged within said opening and having a slit arranged to receive the band of the belt extending through the slit, said slit being defined by a lower wall having a supporting surface arranged to support and deflect the band which is pressed against the supporting surface of said slit with a force which is increased by an increased traction force acting on the band, said lower wall having penetrable portions of reduced thickness, a plurality of locking teeth fixed to the lower edge of said opening in said holding part and aligned with and directed toward said penetrable portions whereby the band may move freely in the slit when the locking teeth are retracted relative to said slit unit, said locking teeth being capable of penetrating said penetrable portions when said slit unit moves under the action of a traction force which exceeds a predetermined value so that said locking teeth will penetrate said penetrable portions and penetrate the band so as to lock it in a fixed position relative to the guide slit device.

2. A guide slit device as claimed in claim 1 wherein said locking teeth extend into and frictionally engage the slit unit below said penetrable portions to assist in preventing movement of said slit unit before the traction force exceeds the predetermined value.

3. A guide slit device as claimed in claim 1 wherein said slit is further defined by the upper wall having a dolly surface for the band when the band is penetrated by said locking teeth.

* * * * *